United States Patent [19]

Ishihata

[11] Patent Number: 4,637,100
[45] Date of Patent: Jan. 20, 1987

[54] HOSE CLAMPING DEVICE

[75] Inventor: Takato Ishihata, Toyota, Japan

[73] Assignee: Toyota Jidosha Kabushiki Kaisha, Japan

[21] Appl. No.: 856,379

[22] Filed: Apr. 28, 1986

[30] Foreign Application Priority Data

May 24, 1985 [JP] Japan .............................. 60-77509[U]

[51] Int. Cl.$^4$ ............................................. B65D 63/02
[52] U.S. Cl. ................................ 24/274 R; 24/20 R; 24/20 EE
[58] Field of Search ............ 24/274 R, 274 WB, 278, 24/279, 20 R, 20 EE, 20 TT

[56] References Cited

U.S. PATENT DOCUMENTS

| | | | |
|---|---|---|---|
| 3,276,090 | 10/1966 | Nigon | 24/274 WB |
| 3,303,544 | 2/1967 | Nigon | 24/274 R |
| 3,924,308 | 12/1975 | Duprez | 24/274 R |
| 4,468,840 | 9/1984 | Sauer et al. | 24/20 R |
| 4,492,004 | 1/1985 | Oetiker | 24/20 R |

Primary Examiner—Victor N. Sakran
Attorney, Agent, or Firm—Parkhurst & Oliff

[57] ABSTRACT

A hose clamping device has a steel clamp band adapted to be tightened around an elastic hose in a ring-like form such that its opposite ends overlap each other. A tightening mechanism is provided on a portion of the band near the underlying end thereof and adapted to pull or push the overlying end, thereby tightening or loosening the band on the hose. A stopper is provided on a portion of the band ahead of the overlying end and is adapted to be contacted by the overlying end, so as to stop the advance of the same. The stopper is constituted by a tab-like portion cut out from a portion of the band and raised in such a manner that the upper surface thereof faces the advance of the overlying end, so as to be pressed down by the overlying end when the latter is pulled by the tightening means. Any excessive tightening by the tightening mechanism only causes the stopper to bend towards the cut out by the pressure applied by the overlying end of the band. Thus, no substantial reduction in the clamping effect is caused by the bending of stopper, thus assuring a stable clamping of the hose on, for example, a pipe end.

9 Claims, 6 Drawing Figures

HOSE CLAMPING DEVICE

BACKGROUND OF THE INVENTION

The present invention relates to an improvement in a hose clamping device for fixing an elastic hose on, for example, an end of a fluid pipe.

Hose clamping devices are widely used for the purpose of clamping and fixing elastic hoses to ends of fluid pipes of various equipment. A typical conventional hose clamping device has a clamp band which is adapted to be placed around the hose in a ring-like configuration such that the opposite ends of the band overlap each other. A holder is provided on one end of the band which is adapted to underlie the other end when wound in the ring-like configuration. A fixing screw rotatably carried by the holder is adapted to engage a plurality of slots formed in the end portion of the band which overlies the other end portion. The slots are spaced at the same pitch as the screw of the fixing screw. As the fixing screw is tightened, the length of the overlap of the ends of the band is increased, thereby tightening the hose onto the pipe end. As a means of a reference for this tightening, a stopper is provided so as to be contacted by the end extremity of the overlying end of the band.

An example of a known hose clamping device having such a stopper is shown in FIGS. 3 and 4. As will be seen from these Figures, the end extremity 1A of the overlying end is adapted to move forwardly along the upper surface of the ring-like band 1 as the fixing screw is tightened. A stopper 2 is formed on the band at a position ahead of the end extremity 1A. The stopper 2 is defined by a tab which is punched from the band 1. The tab constituting the stopper 2 is bent above the surface over which the end extremity 1A moves so that the underside thereof faces the end extremity 1A when tightened. In such prior art clamping devices, cutout 2A formed by punching is positioned between the stopper 2 and the end extremity 1A. In operation, therefore, the end extremity 1A moves along the periphery of the underlying portion of the band so as to first cover the cutout 2A and then abut the stopper 2.

Known hose clamping devices of this type, however, are deficient in that the clamp tends to become unstable when the fixing screw is excessively tightened. Because the tab constituting the stopper 2 is raised by being pulled in the direction of movement of the end extremity 1A, the stopper is forced further up and away from the cutout 2A when pressed strongly by the end extremity 1A as a result of excessive tightening of the fixing screw. As will be seen from FIGS. 4 and 5, an offset exists between the base end of the tab constituting the stopper 2, i.e., the uncut edge of the cutout 2A and the portion of the stopper 2 contacted by the end extremity 1A. As a result, the end extremity 1A of the band abutting the stopper 2 produces a force which tends to further raise the stopper 2 by bending the same about the above-mentioned base end. Consequently, a gap S is formed between the portion of the hose clamp around the base of the stopper 2 and the hose 3 which is hatched in FIG. 6. This gap results non-uniform unstable in clamping of the hose to the fluid pipe.

SUMMARY OF THE INVENTION

Accordingly, a primary object of the invention is to provide a hose clamping device having a stopper constructed in such a way that it contributes to stabilization of the clamp when the band is excessively tightened.

To this end, according to an aspect of the invention, there is provided a hose clamping device having a steel clamp band adapted to be tightened around an elastic hose in a ring-like form such that its opposite ends overlap each other; a tightening mechanism provided on the portion of the band near the underlying end to pull or push the overlying end thereby tightening or loosening the band on the hose; and a stopper provided on a portion of the band ahead of the overlying end and adapted to be contacted by the overlying end such as to stop the advance of the same. In accordance with an aspect of the invention, the stopper is formed from a tab-like portion cut out from a portion of the band and raised such that its upper surface faces the advance of the overlying end of the band when pulled by the tightening mechanism. The tab-like portion of the stopper is arranged such that when it is strongly pressed by the end extremity of the band as a result of excessive tightening, the tab-like portion is pressed down, thereby covering the cut-out. This arrangement eliminates any risk of generation of a gap between the band and the hose, and the instabilities caused thereby.

DESCRIPTION OF THE PREFERRED EMBODIMENT

Figure 1:
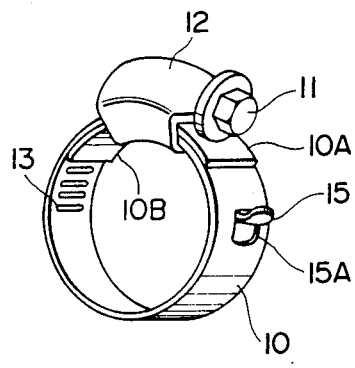
FIG. 1 is a perspective view of an embodiment of the hose clamping device in accordance with the invention.
Figure 2:
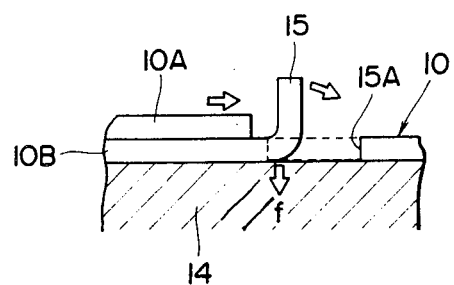
FIG. 2 is a sectional view of an essential portion of the hose clamping device shown in FIG. 1.
Figure 3:
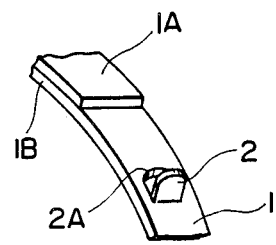
FIGS. 3 and 4 are perspective views of portions of a stopper in a known hose clamping device.
Figure 4:
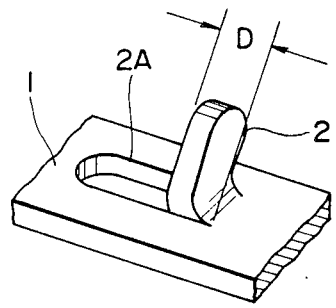
Figure 5:
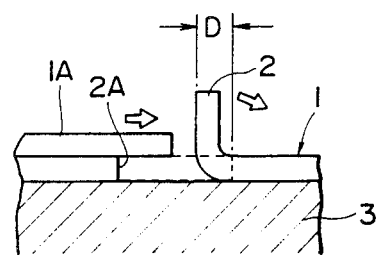
FIG. 5 is a sectional view of the stopper shown in FIG. 4.
Figure 6:
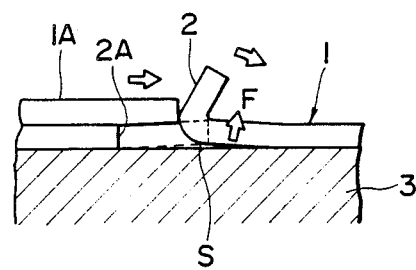
FIG. 6 is a sectional view of the stopper in a state in which the clamping device has been tightened excessively.

FIG. 1 is a perspective view of a hose clamping device embodying the present invention. FIG. 2 shows a cross-section of an essential portion of the embodiment shown in FIG. 1. This hose clamping device has a steel clamp band 10 for placement around an elastic hose with its opposite ends, 10A, 10B overlapping each other. The clamp band may be of a rust-proof steel or may be subjected to a rust-proofing treatment. A holder 12 carrying a fixing bolt 11 is provided on the underlying end 10B of the band 10 and has an opening which allows the overlying end 10A of the band to pass therethrough. The fixing bolt 11 is rotatably carried by the holder 10 to extend in the tangential direction of the band 10 wound in the ring-like form. A plurality of slits 13 are formed in the portion of the band 10 near the overlying end 10A, at the same pitch as the thread of the fixing bolt 11. The thread of the fixing screw 11 engages these slits so that, as the fixing bolt 11 is tightened, the overlying end 10A of the band is driven forwardly, thereby increasing the overlapping length and tightening the band 10 on the hose. The bolt 11 also may be made of a rust-proof steel or may be subjected to an anti-rust treatment.

A stopper 15 is formed on a portion of the band 10 ahead of the overlying end 10A. Stopper 15 functions as a reference in judging the appropriate degree of tightening of the band 10. The stopper 15 is formed by a tab-like portion which is cut out from the band 10 and raised towards the overlying end 10A so that its upper surface faces the advancing end extremity 10A. Cutout 15A in the band portion from which the stopper 15 is cut is positioned on the side of the stopper 15 remote from the overlying end 10A. Cutout 15A is thus formed on the opposite side of the stopper 15 to that in conventional hose clamping devices.

In operation, as the fixing bolt 11 is tightened, the overlying end 10A of the band moves towards the stopper 15. When the stopper 15 is contacted by the overlying end 10A, the stopper is pressed down by the end 10A towards the cutout 15A, producing at its base portion a force f which acts to tighten the band 10 on the hose 14. The gap which is inevitably formed in the conventional clamping device, as stated previously, is avoided by the present invention, so that stable clamping is obtained. In addition, because there is no offset between the point on the stopper 15 on which the force is applied by the overlying end 10A and the base end of the stopper 15 at which the latter is hinged, deformation of the stopper is reduced. This prevents the stopper location from changing in use under the action of end 10A.

As will be understood from the foregoing description, in the hose clamping device of the invention, any excessive tightening of the fixing screw causes only a pressing of the stopper in such a direction that the stopper is forced down onto the hose surface. As a consequence, generation of the gap between the base end of the stopper and the hose is avoided, while enabling a precise control of the tightening amount, thus affording stable clamping. In addition, precise adjustment of the desired degree of tightening is possible by virtue of the reduced deformation of the stopper produced by the tightening force.

What is claimed is:

1. A hose clamping device comprising:

a steel clamp band adapted to be tightened around an elastic hose in a ring-like form such that one end underlies the other;

tightening means provided on a portion of said band near the underlying end thereof and adapted to pull or push said overlying end, thereby tightening or loosening said band on said hose; and a stopper provided on a portion of said band ahead of said overlying end and adapted to be contacted by said overlying end to stop the advance of the same;

said stopper comprising a tab-like portion cut out from a portion of said band and raised such that the upper surface thereof faces the advance of said overlying end of said band, so as to be pressed down towards said cut out by said overlying end when said stopper is forcibly engaged by said overlying end.

2. A hose clamping device according to claim 1, wherein said tab-like portion cut out from said portion of said band is raised substantially orthogonally to the plane of said band.

3. A hose clamping device according to claim 1, wherein said clamp band is made of a rust-proof material.

4. A hose clamping device according to claim 1, wherein said band has been subjected to a rust-proofing treatment.

5. A hose clamping device according to claim 1, wherein said tightening means for pulling or pushing said overlying end includes a holder mounted on a portion of said band near the underlying end thereof, and a bolt rotatably carried by said holder such as to extend tangentially from the ring-like form of said band on said hose, said bolt having a screw thread engageable with a plurality of slits formed in a portion of said band near said overlying end.

6. A hose clamping device according to claim 5, wherein a washer is disposed between said bolt and said holder.

7. A hose clamping device according to claim 5, wherein said bolt is secured to said holder by means of snap ring which is provided on a side of said bolt opposite a head of said bolt.

8. A hose clamping device according to claim 5, wherein said bolt is rust-proof.

9. A hose clamping device according to claim 5, wherein said bolt is comprised of a rust-proof material.

* * * * *